Aug. 4, 1964 E. A. KLEIN 3,143,364
PROCESS FOR BONDING POLYETHYLENE TO NON-POROUS SURFACES
AND LAMINATED POLYETHYLENE PRODUCT
Filed July 29, 1960 2 Sheets-Sheet 2

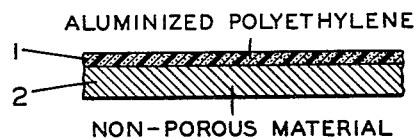
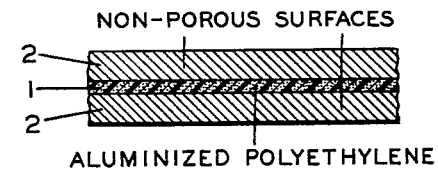
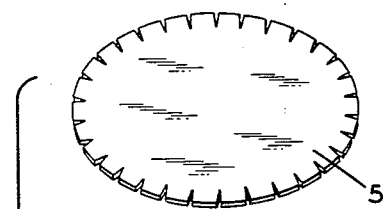
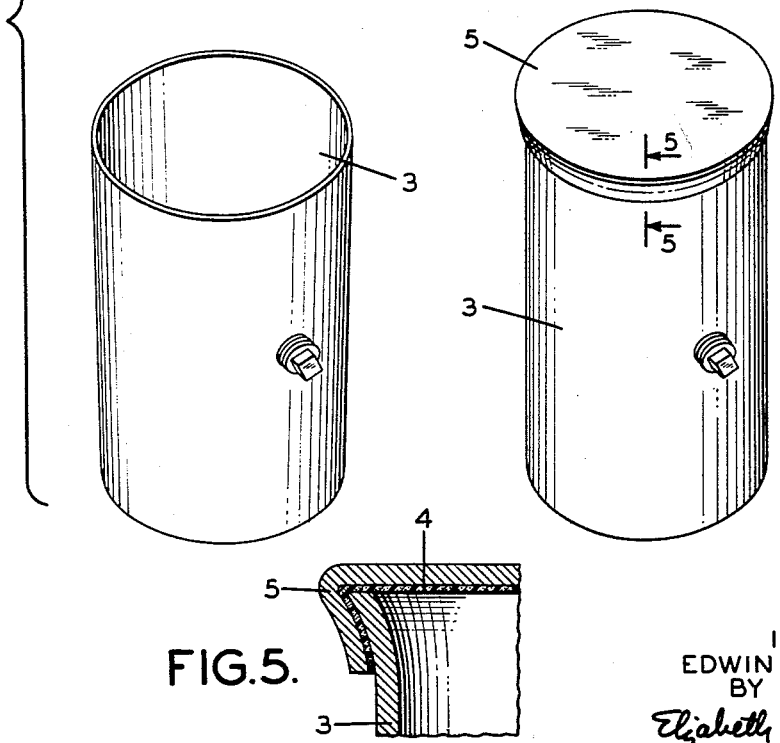

INVENTOR
EDWIN A. KLEIN
BY
Elizabeth Hunter
ATTORNEY

United States Patent Office 3,143,364
Patented Aug. 4, 1964

3,143,364
PROCESS FOR BONDING POLYETHYLENE TO NON-POROUS SURFACES AND LAMINATED POLYETHYLENE PRODUCT
Edwin A. Klein, Basking Ridge, N.J., assignor to Allied Chemical Corporation, New York, N.Y., a corporation of New York
Filed July 29, 1960, Ser. No. 46,119
23 Claims. (Cl. 285—55)

This invention relates to a process for bonding polyethylene to non-porous surfaces and to composite laminated articles comprising a non-porous material tightly bonded to polyethylene.

It has been common practice in the past to laminate or coat various porous materials such as paper, textiles and the like with films of polyethylene. Such films can be made to adhere adequately to such porous materials by heat and/or pressure, applied in various conventional manners such as extruding a coating of molten polyethylene onto the porous structure and pressing the material into the pores of the substrate.

It is well known that polyethylene adheres very poorly, if at all, to non-porous surfaces, in fact its adhesion to metals, etc. is so poor that it has been used as a release agent or a parting agent. Similarly, adhesion of polyethylene to polyethylene surfaces and to other smooth polymer surfaces, is so poor as to make joining of fabricated polyethylene to itself or to other polymer articles difficult.

The valuable properties of polyethylene make its use in conjunction with various non-porous substrates extremely desirable, but heretofore such uses have been drastically limited by the difficulty of obtaining strong bonds with such substrates.

Attempts to obtain such strong bonds by heating the polyethylene in contact with the non-porous surface for extended periods tended to cause thermal degradation of the polyethylene with consequent loss in some of its valuable properties, primarily strength characteristics.

It is an object of the present invention to provide laminates of polyethylene with materials having non-porous surfaces, which have high bond strengths.

It is a further object of the invention to provide a process for securely heat laminating polyethylene to non-porous surfaces without causing significant degradation in the strength of the polyethylene material.

A still further object of the invention is to provide a process for readily joining polyethylene surfaces to other polymer surfaces including polyethylene surfaces.

There and other objects are accomplished according to my invention wherein a polyethylene resin containing dispersed therein between about 8% and about 20% of a finely divided aluminum powder is brought into contact with a normally solid non-porous surface at an elevated temperature between about 240° C. and about 260° C.

It is known to disperse aluminum powder in polyethylene and to apply films of such aluminum-filled polyethylene to porous substrates such as paper, paper board, textiles, etc. Such films have customarily contained only small percentages of aluminum powder, usually not more than about 5%. While such films can be made to adhere to porous articles, they do not readily adhere to non-porous articles, even by the application of heat and pressure, to yield bonds of adequate strength for commercially fabricating such bonded articles.

I have found, surprisingly, that if finely divided aluminum powder is compounded into polyethylene, as by a simple milling process at normal milling temperatures, in amounts between about 8% and about 20% based on the weight of the polyethylene, the resulting mixtures have a high degree of adhesiveness at elevated temperatures for non-porous substrates, and substantially resist strength degradation at temperatures up to about 260° C. Accordingly, compositions of aluminum-filled polyethylene thus prepared are readily bonded by heat alone or by heat and pressure to a variety of non-porous substrates including metals e.g. steel, copper, brass, cadmium, zinc, magnesium, aluminum, chromium, etc., to synthetic rubber, to glass, to ceramics and to other non-porous polymers, including polyesters ("Mylar"), "Teflon" (polytetrafluoroethylene), nylon, "Kel F" (polymonochlorotrifluoroethylene), especially to polyethylene surfaces, to produce laminates having excellent resistance to impact and flexure as well as resistance to chemicals, and exhibit a high degree of flame resistance.

The heat bonding of the aluminum-filled polyethylene to the non-porous substrate may be accomplished by simple conduction, induction or radiation heating of one or both of the surfaces to be bonded. Simple open flame heating of the substrate to the bonding temperature, followed by contacting the substate with a film or layer of the aluminized polyethylene mixture is often sufficient. However, heating of the surfaces by other conduction, induction or radiation means such as by electric band heating, or by hot tools, etc. may be practiced. Electrical resistance heating of the aluminum-filled polymer is not satisfactory since the aluminum-filled polyethylene compositions, while having a high degree of heat conductivity, are non-conductive of electricity. Temperatures of at least about 240° C. must be used for adequate bonding regardless of the fusion point of the polyethylene used in the aluminized composition and suitably one between about 240° C. and about 260° C. Pressure may be applied if desired and may range from atmospheric to 4,500 p.s.i.g. or higher if desired. Under such conditions bonding of the aluminum-filled polyethylene to the substrate takes place rapidly, contact times between about 2 minutes and about 5 minutes usually being sufficient for production of a strong bond.

When it is desired to unite two or more shaped objects, a technique analogous to metal soldering may be employed. Such shapes may be of metal or of any other suitable non-porous material, and the soldering technique is especially adapted for joining molded shapes made of polymeric materials, particularly polyethylene shapes which normally do not adhere to each other. This may be accomplished, for example, by placing a film or sheet of the aluminized polyethylene between the shapes to be joined, followed by heating the aluminized polyethylene to flux the aluminized polyethylene to develop the bond. Such heating may be accomplished with an ordinary "soldering iron" whereby the aluminized polyethylene is caused to flow and act as an adhesive to join the parts together and also in the manner of conventional metal soldering, using a strip of aluminized polymer as solder. Threaded pipe joints may be prepared by contacting a sleeve of the aluminized polyethylene with a pipe length, for example, polyethylene pipe, at one end, and with a suitably lubricated threaded die block at the other, heating the assembly to join pipe length and sleeve in a firm bond and to impress the threads from the die into the sleeve portion, then cooling and removing the threaded die block from the end of the sleeve to provide a threaded pipe member. The threaded die may suitably be a metallic die such as galvanized iron, and may be suitably lubricated as by use of a silicone fluid or other parting agent to prevent adhesion of the aluminized polyethylene to the die.

Threaded pipe couplings provided with oppositely positioned right and left hand threads may be prepared by wrapping an aluminized polyethylene sleeve portion around the threaded ends of two suitably lubricated male die blocks butted end to end, then sliding a length of the desired pipe, either metal or plastic, over the sleeve and heating the entire assembly to mold the threads into the aluminized polyethylene material and to bond the aluminized polyethylene to the surrounding pipe. After cooling the assembly the threaded die members are removed leaving a female coupling which can be threaded into two abutting male pipe lengths.

Polymeric containers such as barrels, drums and the like, can be prepared from cylindrical extruded lengths of various polymers, especially high molecular weight polyethylene, by cutting such extrusions into the desired lengths and providing them with one or two "headings." This heading may be accomplished, for example, by placing the open ended cylinder upon a circular sheet of aluminized polyethylene which is in turn superimposed upon a circular section of polymeric material which may be of the same or different composition as the cylindrical section. The circular sections are then crimped around the cylindrical section, heat is applied causing joinder of the end portion to the cylindrical portion to take place through the "adhesive" aluminized polyethylene. Instead of an entire heading section of aluminized polyethylene, an annular ring of aluminized polyethylene may be used between the cylindrical walls and the polymeric end member to provide joints of sufficient strength for many purposes.

In the drawings,

FIGURE 1 designates a non-porous material having bonded thereto a single layer of aluminized polyethylene.

FIGURE 2 repersents a laminate wherein two non-porous surfaces are bonded by an intermediate layer of aluminized polyethylene.

FIGURE 3 is an exploded view of the parts employed in applying a heading to a drum by use of my invention; FIGURE 4 represents the drum with a heading applied as shown in FIGURE 3, FIGURE 5 is a section taken along 5—5 of FIGURE 4 partly broken away illustrating the aluminized polyethylene bonding layer between the drum section and heading.

Figure 6:
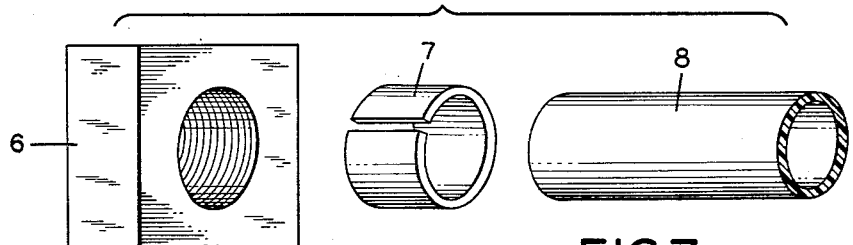
FIGURE 6 is an exploded view of the parts employed in preparing a threaded plastic pipe according to my invention.

In the drawings FIGURES 1–2, numeral 1 represents aluminized polyethylene bonded to non-porous substrate 2. In FIG. 1 a single substrate is shown, in FIG. 2 a laminate of two non-porous surfaces joined by a layer of aluminized polyethylene. FIG. 3, numeral 3 denotes a tubular section of a non-porous material, for example, a polymeric material. Numeral 4 is a circular disc of aluminized polyethylene of diameter slightly greater than the external diameter of the tubular section 5, represents a circular disc of a polymeric material which may be similar to that of the tubular section. The tubular section 3 is "headed" by placing the circular disc 4 on top of the tubular section, placing disc 5 on top of disc 4, forcing the crimped sections over the edges of the cylindrical section, and heating until a bond is formed as illustrated pictorially in FIG. 4, and in section in FIG. 5.

Figure 7:
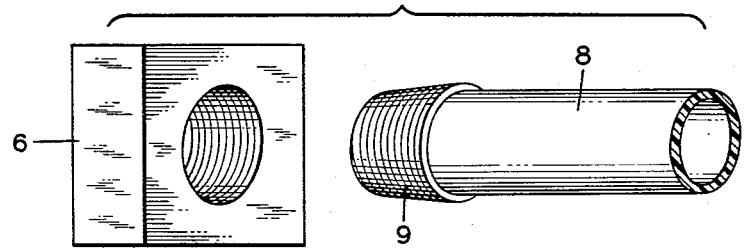
FIGURE 7 represents the finished threaded pipe section removed from the die.

FIG. 6 illustrates preparation of a threaded pipe section wherein aluminized polyethylene sleeve 7 is inserted into lubricated threaded male die block 6 and polymeric pipe section 8 is slid inside aluminized polyethylene sleeve 7. The die block and assembly are heated to mold the impression of the threads into the aluminized polyethylene material and to bond the threaded sleeve to the polymeric pipe section. FIGURE 7 illustrates the completed threaded pipe section after withdrawal from the lubricated die.

Figure 8:
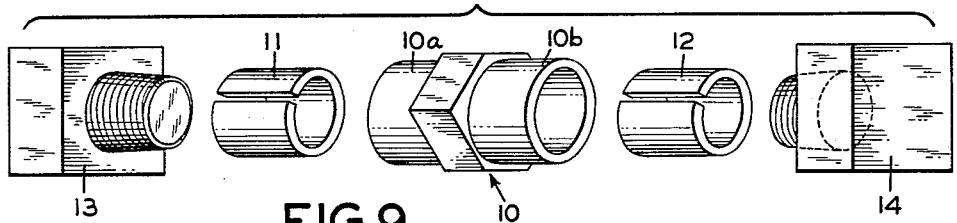
FIGURE 8 is an exploded view of the parts employed in preparing a threaded coupling of the turnbuckle type.
Figure 9:
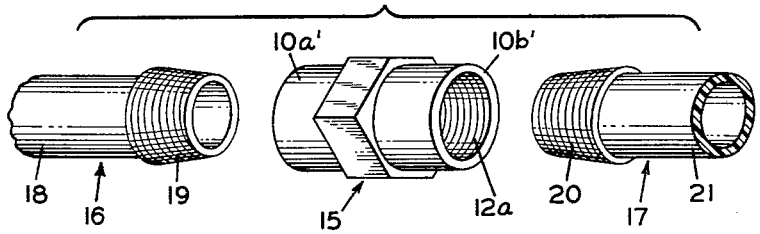
FIGURE 9 is an exploded view of the finished threaded female coupling and two male threaded plastic pipe ends to be joined thereby.
Figure 10:
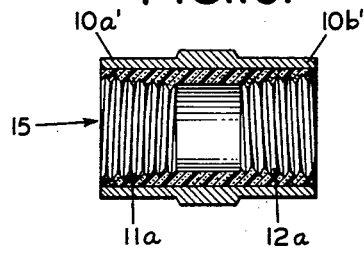
FIGURE 10 is a section of the finished coupling illustrating the internal threaded section composed of aluminized polyethylene bonded to a polymeric shell.

FIGURE 8 illustrates parts assembled for preparation of a female coupling, including polymeric pipe section 10, aluminized polyethylene sleeves 11 and 12 and threaded male die blocks 13 and 14. In preparing the coupling, the aluminized polyethylene members 11 and 12 are placed over the lubricated threaded dies 13 and 14, respectively, and the respective ends 10a and 10b of the pipe section are slid over the aluminized polyethylene sleeves. The assembly is then heated causing threads of the male dies to be impressed into the aluminized polyethylene and causing the sleeve sections to bond to the polymeric pipe sections. After withdrawal of the die blocks 13 and 14 there remains an integral coupling 15, as shown in FIGS. 9 and 10, composed of the pipe section 10 having bonded thereto on its inner circumference the female threaded sleeves 11a and 12a at 10a' and 10b', respectively. This coupling is then ready to couple two male threaded pipe sections 16 and 17 prepared as illustrated in FIGURES 6 and 7, each threaded section being composed of polymeric pipe sections 18 and 21 having bonded thereto aluminized polyethylene threaded portions 19 and 20, respectively.

In preparing laminates, the aluminized polyethylene layer may be applied not only by heat bonding as described above, but may be deposited from a volatile solvent dispersion of the aluminized polyethylene as by dip- or spray coating, pouring, knife coating, etc., followed by evaporation of the solvent. Such dispersions may be prepared by mixing the aluminized polyethylene at elevated temperature with a suitable solvent for the polyethylene such as hydrocarbon or chlorinated hydrocarbon, for example, benzene, toluene, xylene, decalin (decahydronaphthalene), carbon tetrachloride, tetrachloroethylene and the like. In practice, concentrations between about 3% and about 5% of the aluminized polyethylene in the solvent have provided coatings of about 1 mil on aluminum, glass and steel which showed high bond strength under 360° flex and 28 foot-pound impact tests. This method is especially applicable to coating surfaces to be used in contact with corrosive liquids, such as the interiors of drums or other containers, etc.

Polyethylenes of any desired characteristics may be used in the process of my invention. Thus the polyethylene materials suitable for use according to my invention, can be those polymers from ethylene known as high pressure or conventional polyethylenes, i.e. those having densities below about 0.93 and molecular weights ranging from say between about 10,000 and about 30,000; or they may be the so-called "low-pressure" polyethylenes having densities above about .93 and molecular weights above about 50,000, usually in the range of between about 100,000 and about 5,000,000, as well as intermediate polymers and blends.

As is well known, polymers from ethylene are structurally, long chains made up essentially of recurring —$CH_2$ groups, the number of carbon atoms in the chain varying from as low as 60 to as high as 400,000 terminated by —$CH_3$ groups or by a telomer group. Such polyethylenes may contain a small number of branched chains, or, when polymerized in the presence of a coreactant, may contain terminal groups such as alcohol, ester, ketone or ether groups.

The suitable polyethylenes, which usually have melting or softening points above 100° C., for example, between about 100° C. and about 240° C., useful in my invention, are available commercially under such designations as A–C Polyethylene X, Alathon, Marlex, Grex, Polyeth, Polythene, DYNH–3 Petrothene, DYLT, DYNF, DYNH, DYNT, etc.

The particle size of the aluminum powder used may vary over a wide range and suitably may be in the range between about 5 microns and about 44 microns (.005 to .044 millimeter) and preferably should be of such size that at least about 85% passes a No. 325 U.S. screen (.043 mm. openings). The particles may be of spherical, flake or other desired shape.

Table I below illustrates the remarkable heat stabilizing effect on polyethylenes of the presence therein of 10 percent of powdered aluminum, as measured by molecular weight degradation and zero strength temperature.

In the table, the indicated molecular weights are weight average molecular weights obtained from viscosities of .03% solutions of the polyethylene compositions in decalin calculated to molecular weight values using the Mark-Houdwink equation as disclosed by P. S. Francis, R. C. Cook, Jr. and J. H. Elliott, J. Polymer Science, vol. 31, p. 453 (September 1958). While the indicated molecular weight values shown for the aluminized polyethylenes appear somewhat exaggerated or distorted by the presence of aluminum, it is significant to note that none of the indicated values is lessened by heating, with the exception of the ultra high molecular weight polyethylene (sample 5) for which the above method of molecular weight determination is inappropriate. As the this sample, retention of strength characteristics after the heat treatment is evidenced by the "zero strength time" values, obtained by measuring the time in seconds at 260° C. required to cause parting of vertically suspended, notched specimen strips of the unfilled and aluminized polyethylene samples, respectively.

TABLE I

*Molecular Weight Values of Unfilled and Aluminum-Filled Polyethylenes Before and After Heating to 260° C. in Air for 15 Minutes*

| Sample No. | Molecular Weight of Polyethylene | | | |
| --- | --- | --- | --- | --- |
| | Unfilled Polyethylene | | 10% Aluminized P.E. | |
| | Before Heating | After Heating | Before Heating | After Heating |
| 1 | 55,000 | | | 49,000 |
| 2 | 110,000 | 65,000 | 130,000 | 140,000 |
| 3 | 44,000 | | | 43,000 |
| 4 | 80,000 | 40,000 | 100,000 | 100,000 |
| 5 | 1,560,000 | 39,000 | 560,000 | 230,000 |

| | Zero Strength Time at 260° C. (Seconds) | | | |
| --- | --- | --- | --- | --- |
| 5 Mol Wt. 1,560,000 | 374 | 81.4 | 553.6 | 549 |

It is interesting to note that polyethylene per se suffers severe molecular weight and strength degradation when heated for appreciable periods in the presence of air or oxygen to temperatures of 260° C., i.e. to temperatures sufficient to cause even poor bonding in the absence of aluminum powder. Additions of percentages of aluminum up to at least 5% by weight contribute little, if any, heat stabilizing effects. However, the addition of percentages between about 8% and about 20% results in a composition providing firm bonding and spectacular heat stabilizing effect with ability to prevent substantial molecular weight degradation on heating. Percentages of aluminum higher than about 20% prevent good adhesion of the aluminum-filled polyethylene material to non-porous substrates.

The bonded products prepared according to my invention are useful for many purposes. The laminates consisting of a single layer of aluminized polyethylene heat bonded to metals such as steel are useful in the manufacture of heat, moisture and chemical-resistant structures, tank linings, etc., in the production of masked areas in the etching of steel, ceramic or other non-porous surfaces, for building materials, boat hull construction and the like. The application of an aluminized-polyethylene layer intermediate between two non-porous surfaces permits the lamination and bonding of normally non-adherent surfaces in the form of strongly bonded laminates. Thus, for example, the application of the aluminum-filled polyethylene to polyethylene surfaces, permits bonding of one polyethylene surface to another polyethylene surface through the intermediately placed aluminum-containing polyethylene composition. This technique can be used not only to laminate flat sheets together but can also be employed to join shaped articles, and in application of the aluminized polyethylene as a "solder," as described above.

The following specific examples further illustrate my invention. Parts are by weight except as otherwise noted.

EXAMPLE 1

Ten parts of atomized aluminum powder having particle size in the range 5 microns to 20 microns, was milled at 175° C. on a conventional two-roll rubber mill into 100 parts of a linear polyethylene resin of density 0.94 having a molecular weight in the range between about 1,000,000 and about 1,500,000 and strength values according to ASTM test method D–412 of elongation 476%, and tensile 4820 p.s.i. when sheeted to a thickness of 0.057 inch and drawn at the rate of 20″ per minute. Milling of the polyethylene and aluminum powder was continued for 15 minutes. The resulting homogeneous aluminum powder-filled composition contained 9.8% aluminum and 90.2% polyethylene. It was sheeted into a film of 0.057 inch thickness on a roller mill and tested according to ASTM test method D–412. Elongation was found to be 440%; tensile was 4686 p.s.i. The film thus prepared was bonded to a steel plate by heating the plate to 240° C., and, while the plate was horizontal, placing the film of aluminum-filled polyethylene on top of the plate with the surface of the film in contact with the surface of the steel. No pressure other than that of the weight of the film was used to effect contact between the surfaces. Temperature of 240° C. was maintained for 5 minutes with the film in contact with the steel, to cause bonding of the film to the steel. The surfaces were then cooled, and the resulting laminate tested for impact and flex resistance by the Gardner variable impact test and the Gardner conical mandrel test, respectively ("Chemical and Physical Examination of Paints, Varnishes, Lacquers and Colors" by Henry A. Gardner and G. G. Sward, 11th ed. (1950), pp. 188–188A and 171–172, respectively).

In the Gardner variable impact test, above referred to both sides of the test piece are subjected to 28 inch pound impact by placing the sample panel in a ½ inch hole in the base plate of the test instrument, raising the weight to maximum height of 28 inches and releasing the weight to drop on the sample. Results are read from the instrument support pillar, calibrated in inch pounds.

In the flex test according to the Gardner conical mandrel test, the panel to be flexed is clamped between a cone of the instrument and a drawbar which guides the panel around a mandrel. The panel is bent at the rate of 180° in 15 seconds. The coating under test is elongated 2.6% at the base of the cone to 28% at its narrow end. After testing in the above manner in the Gardner conical mandrel test, the sample was hand bent to 360° C. When the sample prepared above was tested for impact according to the Gardner variable impact test as described the bond remained intact when subjected to forces of 28 inch pounds on both sides. The laminated sheet withstood flexing through 360°, four times without rupture of the bond. Unfilled polyethylene of the character used herein cannot be laminated to steel to provide any bond whatsoever.

The aluminum filled polyethylene film on the steel was tested for resistance to alkalis and acids by exposing portions of the film surface in horizontal position to dropping of solutions of 20% NaOH and concentrated HCl for 4 hours. After such exposure, no penetration of the film by either solution had occurred.

EXAMPLE 2

Ten parts of powdered aluminum of a particle size such that 85% passed a No. 325 U.S. Standard screen, was milled into 100 parts of a linear polyethylene resin having characteristics similar to those described under Example 1 and resulted in a homogeneous, aluminum-filled polyethylene film of 0.04" thickness containing about 9.8% aluminum.

A portion of the aluminum-filled polyethylene film was bonded to a steel plate by heating the plate to 245° C., laying the film on the steel plate without the application of pressure, and allowing it to remain at the above temperature for 5 minutes. A strong bond resulted.

Two steel plates 1½ x 1½" in area were heat bonded by placing between the plates a sheet of the same dimensions aluminized polyethylene prepared by the above procedure. The assembly was heated to 240° C. without application of pressure. In a cleavage test, applied by pulling the sample apart by force applied perpendicular to the planar axis of the sample, the bond remained intact until 700 p.s.i. had been applied.

EXAMPLE 3

Ten parts of powdered aluminum of particle size such that 85% passed a No. 325 U.S. Standard screen was milled on a 2 roll rubber mill into 100 parts of a branched polyethylene resin of density 0.94, molecular weight about 50,000, for 15 minutes until a homogeneous film of 0.04" thickness was produced. The resulting film was used as a solder to join together various stock shapes of polyethylene including a funnel top and stem, and a polyethylene beaker and handle by heating the aluminum-filled polyethylene by means of a soldering iron to 245° C. applied between the unfilled polyethylene parts to be joined, then contacting the hot aluminum-filled polyethylene coating with the second polyethylene shape to be joined to the first shape. Similarly, films of aluminized polyethylene were joined to surfaces of synthetic rubber and to "Kel F" (chlorotrifluoroethylene polymer), nylon, polyethylene and unglazed ceramic tile, forming bonds which withstood normal handling and usage without parting.

EXAMPLE 4

Film prepared as described in Example 3 by milling on a rubber mill, 10 parts of aluminum powder of the character described in Example 3 into 100 parts of a branched polyethylene of density .93 and molecular weight of about 50,000, and having a thickness of 0.04 inch was laminated to unglazed ceramic tile by placing the film on the surface of the tile and heating the tile to 240° C. by means of a hot plate, whereupon the aluminum-filled polyethylene film adhered strongly to the ceramic surface. After cooling the tile was shattered by dropping on a concrete floor but the pieces remained bonded together by the force of the adhering aluminum-filled polyethylene film.

EXAMPLE 5

Ten parts of aluminum powder of a particle size such that 85% passed a No. 325 U.S. Standard screen was milled on a two-roll rubber mill into a linear polyethylene resin of density 0.94 and molecular weight in the range 1,000,000 to 1,500,000. The filled polymer was mixed at 150° to 190° C. with 97 parts of decalin which produced a homogeneous fluid dispersion. Test strips of aluminum, steel, copper, glass and iron were then dipped in the hot solution, resulting in a deposit of aluminum-filled polyethylene on the strips. The solvent was evaporated from the coatings under an infrared lamp at 140° C. and the temperature of the strips then was raised to 240° C., thus producing continuous coatings on the strips of about 1 mil thickness which had adhesion characteristics similar to those obtained by contact lamination as measured by impact and flex tests.

EXAMPLE 6

Eight parts of the atomized aluminum powder described in Example 1 were milled on a two-roll rubber mill into 100 parts of a linear polyethylene of the same character as described in Example 1, and the resulting 10 mil film was bonded to steel as described in Example 1. The bond exhibited flex characteristics such that the bond parted only after six flexes through 360°, i.e. slightly inferior in these respects to a film containing 10 parts of aluminum.

EXAMPLE 7

Two lengths of polyethylene pipe of 1 inch O.D. were joined together in several different ways as set forth below.

(a) A 30 mil sheet of aluminized polyethylene prepared by blending 10 parts of aluminum powder of particle size such that 85% passed a No. 325 U.S. screen, with 100 parts of a high density polyethylene of average molecular weight about 59,000, on a two-roll rubber mill. A threaded male pipe joint was prepared by inserting a sleeve of this 30 mil sheet 6 x 6 inches into an interiorly lubricated 1¼ inch threaded galvanized iron cap so that the threads of the cap were completely covered by the aluminized polyethylene sleeve. A length of 1 inch O.D. polyethylene pipe, prepared by extrusion from a pipe compound made with polyethylene of about 750,000 average molecular weight, was then inserted into the sleeve, making a relatively snug fit. The temperature of the assembly was then raised to 240° C. by placing it upright on a hot plate, and maintained at that temperature for about 5 minutes, after which it was allowed to cool to room temperature. The polyethylene pipe was then unscrewed from the lubricated metal pipe cap, leaving a threaded joint of aluminized polyethylene molded to the end of the polyethylene pipe.

(b) A female coupling was prepared by wrapping a 6" x 6", 30 mil sleeve of aluminized polyethylene around the threaded ends of two lubricated galvanized iron pipe nipples which had been butted end to end (it is necessary to use two nipples in order to obtain mold impressions of right and left hand threads). Then a 2-inch long piece of 1¼ inch I.D. polyethylene pipe was slid over the sleeve. The assembly was heated to 240° C. by inserting a tubular ("Chromalox") electric heater through the galvanized nipples and maintaining the indicated temperature for about 5 minutes. The assembly was then cooled to room temperature, the nipples were removed, leaving a polyethylene pipe coupling which could be threaded into two abutting male polyethylene pipe lengths prepared as described in (a) above. Attempts to pull these joints apart by hand when held in a vise failed. When the same procedure is followed using unfilled polyethylene of the character described, in an attempt to prepare a coupling, no joinder of the parts takes place.

(c) A second group of pipe joints was prepared by slipping an extruded coupling of a 10% aluminized polyethylene over the butted ends of two lengths of polyethylene pipe, overwrapping the pipe with aluminum foil, heating by means of a snug fitting electric band heater to 240° C. for 5 to 10 minutes, cooling and removing the foil.

(d) Another group of joints was made by wrapping a 3¼ x 2 inch 30 mil thick sheet of aluminized polyethylene over the butted ends of two lengths of polyethylene pipe, heating the assembly to 240° C. for 5 minutes with an electric band heater or naked flame and cooling.

Some of the joints of the character described in (d) above, were reenforced further by covering the aluminum-filled polyethylene joint with a length of unfilled polyethylene pipe which had been prepared by heating a length of pipe to 90° to 180° F., and forcing the heated pipe length over a mandrel which had a diameter larger than the inside diameter of the polyethylene pipe. The assembly was heated to 90° F. whereupon the expanded unfilled polyethylene pipe shrank to within 5% of its original inside diameter, forming a tight protective sheath over the joint. The resulting joints were tested for stress life under long term hydrostatic pressure (Hoop stress) according to ASTM test method D–1598–28T modified by basing values on I.D. of pipe rather than O.D. with results as shown in Table II below.

TABLE II

*Stress Life Tests on Pipe Joints, ASTM D–1598–28T*

| Polyethylene, Molecular W. | Percent Al | Type Weld | Unfilled Polyethylene Shrink Sleeve | Temp. °F. | P.s.i. | Hoop Stress | Failure Time, Hrs. |
|---|---|---|---|---|---|---|---|
| 59,000 | 10 | Elec. Band Heater | No | 120 | 90 | 950 | 100 |
| 59,000 | 10 | ___do___ | Yes | 120 | 125 | 525 | 21.25 |
| 80,000 | 10 | Naked Flame | Yes | 180 | 72 | 525 | 30.4 |
| 30,000 | 20 | Elec. Band Heater | Yes | 180 | 72 | 525 | 75.5 |

EXAMPLE 8

Polyethylene pipe was heat bonded to steel pipe couplings by placing a 10% aluminized polyethylene film of 1/16" thickness between the polyethylene pipe and the steel coupling, heating the assembly to 245° C. whereby a strong bond between steel and polyethylene pipe was formed. The strength of the bond was tested by using the bonded coupling as a hammer to drive a 10 penny nail through a wooden 2 x 4 beam. No visible effect on the bond resulted.

EXAMPLE 9

Several lengths of polyethylene pipe prepared from "low pressure" high density (.955) polyethylene of average molecular weight of about 750,000, having dimensions of 3 inches diameter by six inches length were "headed" after drilling an open headed bung hole vent in the side, as follows: A blank was formed of a circular piece of a flattened, thin-walled polyethylene pipe compound, cut approximately 3/4" larger in diameter than the pipe to be "headed." Notches were cut spokewise around the periphery of this blank to a depth to allow for crimping over the end of the pipe. A second blank was formed from a circular piece of aluminized polyethylene sheet stock, 100 mils thick, prepared by milling 100 parts of polyethylene having a density of .94 and an average molecular weight of 1,560,000, with 10 parts of flake aluminum of which about 85% passed through a No. 325 U.S. Standard screen, cut 1/4" larger than the diameter of the pipe. The aluminized polyethylene blank was then placed over the circular flattened polyethylene pipe material blank and over the aluminized polyethylene blank, the slightly flared polyethylene pipe preheated to 240° C. was placed on end. The blanks and the pipe were then forced into the bottom of a cylindrical vessel of diameter slightly larger than that of the pipe length, so that the pipe just slipped into it endwise. The polyethylene and aluminized polyethylene blank were thus forced to crimp over and overlap the end of the pipe. The cylindrical vessel containing the crimped assembly was then heated to 250° C., and a 10 pound weight was applied to the top of the polyethylene pipe to maintain contact of the parts to be joined, and heat and pressure were maintained for about 10 minutes, then the assembly was allowed to cool to room temperature. The opposite end of the pipe was then treated in the same manner. In this manner, strong joints were formed without further curing. The drums thus prepared were subjected to impact tests as follows:

(1) One drum was filled with water and was dropped from a height of 25 feet onto a concrete floor. The heads prepared as described survived three such drops.

(2) Empty drums were dropped from a height of 40 feet onto a concrete floor, and survived at least 3 such drops.

(3) Drums containing a 1 inch steel ball were dropped 40 feet onto a concrete floor and survived 3 such drops.

EXAMPLE 10

A three-ply laminate was prepared by heating on a hot-plate to 2450° C. for 5 minutes, a sheet of expanded steel mesh having about 1" by 1/2" openings, a 10% aluminized polyethylene film of 1/16" thickness, and a 1/8 inch thick (1" x 2") sheet of extruded high density polyethylene pipe compound prepared from polyethylene of average molecular weight of about 750,000. After cooling, the laminate was tested by dropping onto it repeatedly (10 times) a 7 pound weight from a height of 4 feet without damage to the bond. Samples of the above laminate were exposed to alternate UV light and water spray in a Weatherometer and showed no degradation after 240 hours of such exposure.

Thus by the process of my invention not only can non-porous surfaces be coated with a tightly adhering polyethylene coating containing aluminum powder dispersed therethrough, but such non-porous surfaces may be bonded to other non-porous surfaces through an intermediate layer or coating of the aluminum-filled polyethylene material. Thus metals may be joined to other metals or to polymeric materials and polymers may be joined to other polymers of the same or different character to produce articles adapted for a wide variety of uses.

While the above describes the preferred embodiments of the invention it will be understood that departures may be made therefrom within the scope of the specifications and claims.

I claim:

1. A process for bonding aluminum-containing polyethylene to non-porous solid surfaces, which comprises contacting said surface at a temperature between about 240° C. and about 260° C. with a composition consisting essentially of between about 92% and about 80% of a normally solid polyethylene and between about 8% and about 20% of a finely divided aluminum powder uniformly dispersed therethrough, for a period sufficient to cause fluxing of the aluminum-filled polyethylene composition and cooling the resulting bonded composition.

2. The process according to claim 1 wherein the non-porous surface is a metal.

3. The process according to claim 1 wherein the non-porous surface is polyethylene.

4. A process for bonding to each other non-porous solid surfaces, which comprises contacting such surfaces at a temperature between about 240° C. and about 260° C. with a composition comprising a normally solid polymer of ethylene having substantially uniformly dispersed therethrough between about 8% and about 20% of aluminum powder of such particle size that at least about 85% passes a 325 mesh U.S. Standard screen and thereafter maintaining such surface in contact with said composition at said temperature until fluxing of the aluminized polyethylene has occurred, and thereafter cooling the surfaces.

5. A process for bonding to each other, non-porous solid surfaces, which comprises contacting a first non-porous solid surface with a composition consisting essentially of between about 92% and about 80% of a normally solid polyethylene and between about 8% and about 20% of a finely divided aluminum powder uniformly dispersed throughout the polyethylene, at a temperature between about 240° C. and about 260° C. until fluxing of the aluminum-filled composition in contact with the non-porous surface has taken place, thereby at least partially coating the non-porous surface with fluent aluminum-filled polyethylene coating, and thereafter contacting the effluent aluminum-filled polyethylene coating with a second non-oporus surface at temperatures between about 240° C. and about 260° C. and cooling the resulting bonded surfaces.

6. The process according to claim 5 wherein both the first and second surfaces are metals.

7. The process according to claim 5 wherein the first surface is a metal, the second surface is a solid polymeric material.

8. The process according to claim 5 wherein both first and second surfaces are polymeric materials.

9. The process according to claim 5 wherein both first and second surfaces are polyethylene.

10. A composite article comprising a non-porous solid surface, said surface having tightly bonded thereto a substantially homageneous composition consisting essentially of between about 92% and about 80% of polyethylene and between about 8% and about 20% of a finely divided aluminum powder.

11. A laminated article consisting of at least two non-porous solid shaped structures, bonded together by an intermediate layer of a substantially homogeneous composition consisting essentially of between about 92% and about 80% polyethylene and between about 8% and about 20% of a finely divided aluminum powder.

12. The laminated article according to claim 11 wherein the non-porous structures are both metal.

13. The laminated article according to claim 11 wherein at least one non-porous structure is metal and at least one non-porous structure is a polymeric material.

14. The laminated article according to claim 11 wherein at least two of the non-porous structures are polyethylene.

15. A process for bonding solid polyethylene shaped structures to other solid polyethylene shaped structures which comprises applying to a first polyethylene structure a coating of a composition consisting essentially of between about 92% and about 80% of a normally solid polyethylene and between about 8% and about 20% of finely divided aluminum powder uniformly dispersed throughout the polyethylene, at a temperature between about 240° C. and about 260° C., contacting the adherent aluminum-filled polyethylene coating with a second polyethylene structure at a temperature between about 240° C. and about 260° C. and thereafter cooling the bonded shape thus produced.

16. The process for producing a threaded male pipe fitting which comprises placing an annular sleeve of aluminized polyethylene containing between about 8% and about 20% of finely divided aluminum, around the end of a polymeric pipe, inserting the pipe end section and surrounding sleeve into a female threaded die block, heating the pipe section and sleeve in contact with the die threads to a temperature between about 240° C. and about 260° C. until threads have been impressed in the sleeve portion and said sleeve portion has formed a strong bond with said polymeric pipe, cooling the resulting threaded pipe section and removing it from the die.

17. The process for preparing a threaded female plastic pipe coupling which comprises placing annular sleeve sections of aluminized polyethylene containing between about 8% and about 20% of finely divided aluminum into opposite ends of an annular section of polymeric pipe, inserting two threaded male die blocks into contact with the aluminized polyethylene sections in abutting relation to each other, heating the die blocks, sleeve and polymeric pipe sections in contact with each other to a temperature between about 240° C. and about 260° C. until threads have been impressed in the aluminized polyethylene sleeve portions, and said sleeve portions have formed a strong bond with said pipe section, cooling the resulting threaded coupling and separating it from the dies.

18. A threaded polyethylene pipe section which comprises a polyethylene pipe having tightly bonded thereto a threaded section consisting essentially of an aluminized polyethylene containing between about 8% and about 20% of finely divided aluminum.

19. A female coupling of the turn-buckle type consisting essentially of a length of polyethylene pipe having tightly bonded to the opposite portions of its inside circumference, oppositely threaded layers of aluminized polyethylene containing between about 8% and about 20% of finely divided aluminum.

20. A headed drum comprising a cylindrical polymeric plastic member and a circular polymeric plastic heading bonded together by an intermediate layer of a substantially homogeneous composition consisting essentially of between about 92% and about 80% of polyethylene and between about 8% and about 20% of a finely divided aluminum powder.

21. The laminated article according to claim 11 wherein at least one of the non-porous shapes is metal.

22. The laminated article according to claim 11 wherein at least one of the non-porous shapes is selected from the group consisting of glass shapes and ceramic shapes.

23. The laminated article of claim 11 wherein at least one structure is a polymeric material selected from the group consisting of polyethylene, polyesters, polytetrafluoroethylene, polymonochlorotrifluoroethylene and synthetic rubbers.

References Cited in the file of this patent

UNITED STATES PATENTS

| | | |
|---|---|---|
| 2,400,139 | Roland | May 14, 1946 |
| 2,510,727 | Sussenbach | June 6, 1950 |
| 2,551,591 | Foord | May 8, 1951 |
| 2,593,943 | Wainer | Apr. 22, 1952 |
| 2,638,523 | Rubin | May 12, 1953 |
| 2,697,058 | Lasak | Dec. 14, 1954 |
| 2,739,829 | Pedlow et al. | Mar. 27, 1956 |
| 2,833,030 | Peaslee | May 6, 1958 |
| 2,909,443 | Wolinski | Oct. 20, 1959 |
| 2,943,967 | Simon | July 5, 1960 |
| 2,951,246 | Halpern et al. | Aug. 30, 1960 |
| 3,101,207 | Pavel et al. | Aug. 20, 1963 |

FOREIGN PATENTS

| | | |
|---|---|---|
| 140,349 | Australia | Feb. 12, 1948 |